United States Patent
Hanaoka

(10) Patent No.: US 7,383,971 B2
(45) Date of Patent: Jun. 10, 2008

(54) POWDER BODY METERING APPARATUS

(75) Inventor: Kazunari Hanaoka, Nagoya (JP)

(73) Assignee: Matsui Mfg. Co., Ltd., Osaka (JP)

( * ) Notice: Subject to any disclaimer, the term of this patent is extended or adjusted under 35 U.S.C. 154(b) by 466 days.

(21) Appl. No.: 10/506,463

(22) PCT Filed: Jun. 9, 2003

(86) PCT No.: PCT/JP03/07303

§ 371 (c)(1),
(2), (4) Date: Sep. 1, 2004

(87) PCT Pub. No.: WO2004/003487

PCT Pub. Date: Jan. 8, 2004

(65) Prior Publication Data

US 2006/0169726 A1 Aug. 3, 2006

(30) Foreign Application Priority Data

Jun. 27, 2002 (JP) .............................. 2002-187087

(51) Int. Cl.
*G01F 13/00* (2006.01)
(52) U.S. Cl. ...................... 222/440; 222/285; 222/306; 222/432; 222/438; 222/450
(58) Field of Classification Search .......... 222/43–434, 222/438–440, 442, 450, 630, 636, 637, 285, 222/286, 305–308
See application file for complete search history.

(56) References Cited

U.S. PATENT DOCUMENTS

| 868,641 | A | * | 10/1907 | Clark | .......................... 222/439 |
| 1,105,732 | A | * | 8/1914 | West | ........................... 222/47 |
| 1,149,442 | A | * | 8/1915 | Hewson | ...................... 222/439 |
| 2,588,206 | A | * | 3/1952 | Clark | .......................... 222/439 |
| 3,089,620 | A | * | 5/1963 | Green et al. | .................. 222/89 |
| 5,234,037 | A | * | 8/1993 | Derby | .......................... 141/67 |
| 6,959,843 | B2 | * | 11/2005 | Kondo | ........................ 222/195 |

FOREIGN PATENT DOCUMENTS

| CN | 2350735 Y | 11/1999 |
| JP | 2-212743 | 8/1990 |
| JP | 2002-148092 | 5/2002 |

\* cited by examiner

*Primary Examiner*—J. Casimer Jacyna
(74) *Attorney, Agent, or Firm*—R. Neil Sudol; Henry D. Coleman; William J. Sapone

(57) ABSTRACT

In a powder body metering apparatus for metering a powder body such as a synthetic resin raw material or the like, a powder body discharge port (55) is formed in a lower portion of a metering container (17) of a metering apparatus (6) and is freely opened and closed by a case (50) provided with a porous body (19), the powder body metered by the metering container (17) is discharged from the powder body discharge port (55) of a lower tube (22) by horizontally oscillating the case (50) so as to open the powder body discharge port (55), whereby it is possible to easily meter and confirm a weight or the like of the powder body metered by the metering container (17).

2 Claims, 3 Drawing Sheets

POWDER BODY METERING APPARATUS

TECHNICAL FIELD

The present invention relates to a powder body metering apparatus which is preferably used for metering a powder body such as a synthetic resin raw material or the like.

BACKGROUND ART

The following two metering apparatuses have been conventionally known as this kind of metering apparatus.

A first conventional metering apparatus has a base plate having an inlet and an outlet provided through in a vertical direction, a slide plate provided in a lower surface of the base plate so as to freely move horizontally and having a through hole provided in a vertical direction, and a metering container in which an edge portion of an upper end opening is fixed to an edge portion of the through hole of the slide plate, and is structured such that the slide plate freely moves between a position at which the through hole meets the inlet of the base plate and a position at which the through hole meets the outlet of the base plate, the inlet of the base plate is closed in a state in which the through hole meets the outlet of the base plate, and the metering container has an upper tube, a lower tube which is fitted to and covers the upper tube so as to be freely adjustable in a vertical position, and a porous body provided in a lower end of the lower tube and not allowing a powder body having a set magnitude to pass through and allowing a gas to pass through.

A second conventional metering apparatus has a metering container having an inlet in an upper end and a horizontal outlet in an upper side portion, a check valve for opening and closing the inlet of the metering container, and an upward discharge pipe connected to the horizontal outlet, and is structured such that the metering container has an upper tube, a lower tube which is fitted to and covers the upper tube so as to be freely adjustable in a vertical position, and a porous body provided in a lower end of the lower tube and not allowing a powder body having a set magnitude to pass through and allowing a gas to pass through (refer to Japanese Unexamined Patent Publication No. 2002-148092).

The conventional metering apparatuses mentioned above have the following disadvantage.

Since the metering container is not provided with a powder body discharge port, it is necessary to completely take out the lower tube from the upper tube in the case of metering and confirming the weight or the like of the powder body metered by the metering container. Accordingly, there is a disadvantage that an operation is troublesome.

DISCLOSURE OF THE INVENTION

The present invention employs the following means for solving the disadvantage mentioned above.

(1) In accordance with a first aspect of the present invention, there is provided a powder body metering apparatus having a base plate having an inlet and an outlet provided through in a vertical direction, a slide plate provided in a lower surface of the base plate so as to freely move horizontally and having a through hole provided in a vertical direction, and a metering container in which an edge portion of an upper end opening is fixed to an edge portion of the through hole of the slide plate, and structured such that the metering container is variable in an internal capacity and is provided in a lower portion with a porous body not allowing a powder body having a set magnitude to pass through and allowing a gas to pass through, the slide plate freely moves between a position at which the through hole meets the inlet of the base plate and a position at which the through hole meets the outlet of the base plate, and the inlet of the base plate is closed in a state in which the through hole meets the outlet of the base plate, wherein a powder body discharge port is formed in a lower portion of the metering container, and the powder body discharge port is freely opened and closed by a closing member for inhibiting the powder body from flowing out therefrom.

(2) In accordance with a second aspect of the present invention, there is provided a powder body metering apparatus having a metering container having an inlet in an upper end and a horizontal outlet in an upper side portion, a check valve for opening and closing the inlet of the metering container, and an upward discharge pipe connected to the horizontal outlet, and structured such that the metering container is variable in an internal capacity and is provided in a lower portion with a porous body not allowing a powder body having a set magnitude to pass through and allowing a gas to pass through, wherein a powder body discharge port is formed in a lower portion of the metering container, and the powder body discharge port is freely opened and closed by a closing member for inhibiting the powder body from flowing out therefrom.

The present invention achieves the following effect on the basis of the structures mentioned above.

In accordance with the inventions described in the first aspect and the second aspect, since the powder body can be discharged from the powder body discharge port by opening the powder body discharge port, it is possible to easily meter and confirm the weight or the like of the powder body metered by the metering container.

BEST MODE FOR CARRYING OUT THE INVENTION

Figure 1:
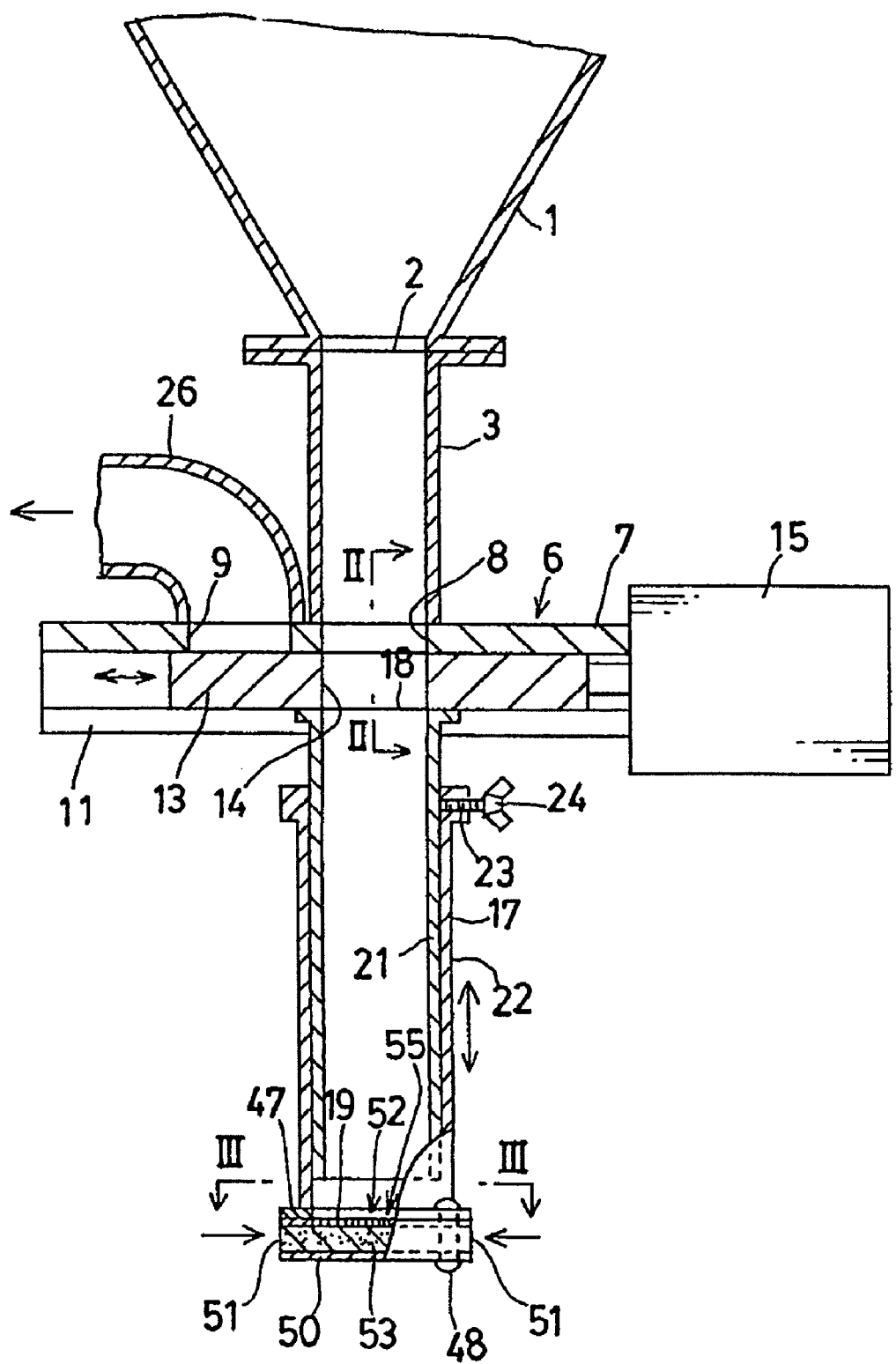
FIG. 1 is a cross sectional view of a main portion showing a first embodiment in accordance with the present invention.

A description will be given below of two embodiments in accordance with the present invention.

In this case, the same members will be shown by the same reference numerals in this description.

First Embodiment

Figure 2:
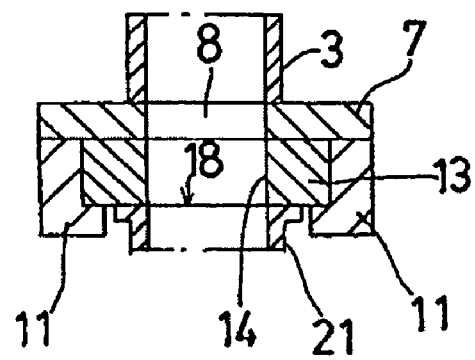
FIG. 2 is a cross sectional view along a line II-II in FIG. 1.
Figure 3:
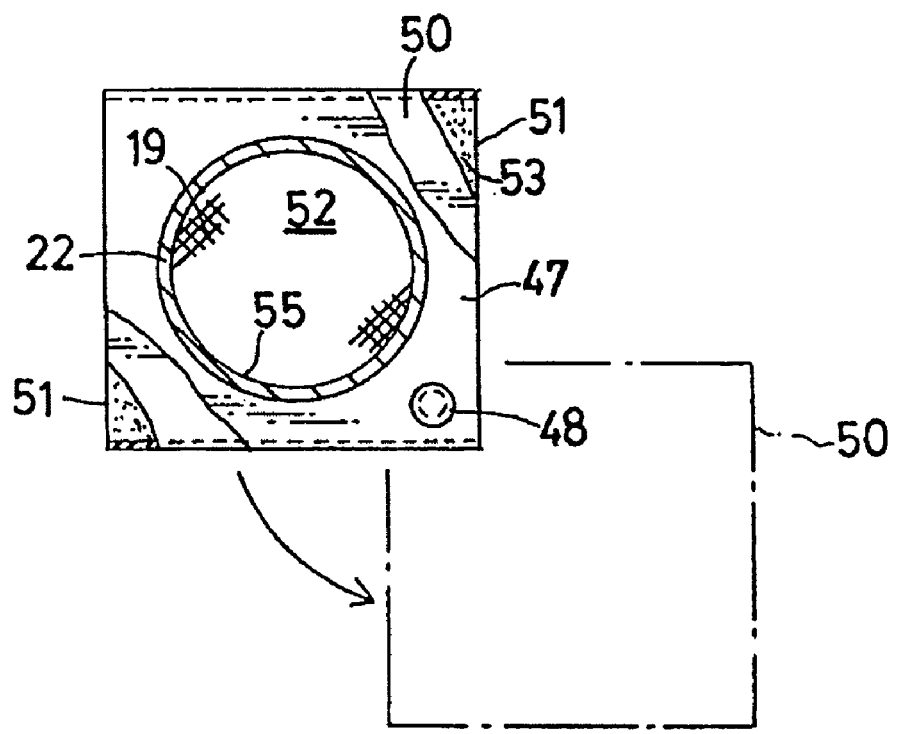
FIG. 3 is an enlarged cross sectional view along a line III-III in FIG. 1.

Refer to FIGS. 1 to 3

A vertical guide tube 3 is connected to an outlet 2 of a reservoir hopper 1 reserving a powder body, and a metering apparatus 6 is mounted to a lower end of the guide tube 3.

The metering apparatus 6 has a base plate 7 having an inlet 8 provided through in a vertical direction (a peripheral edge of the inlet 8 is connected to the lower end of the guide tube 3) and an outlet 9 provided through in a vertical direction, a slide plate 13 provided in a lower surface of the base plate 7 so as to be freely moved horizontally (freely moved laterally in FIG. 1) on the basis of an operation of a guide member 11 and having a through hole 14 provided in a vertical direction, and a metering container 17 in which an edge portion of an upper end opening 18 is fixed to an edge portion of the through hole 14 of the slide plate 13.

The metering container 17 has an upper tube 21 in which an axis is directed in a vertical direction (in which an upper end forms an upper end opening 18), a lower tube 22 fitted to the upper tube 21 so as to be freely adjustable in a vertical position, a case 50 provided on a flange 47 arranged in a lower portion of the lower tube 22 so as to be freely oscillated horizontally via a support shaft 48 in which an axis is directed in a vertical direction, and a known lock apparatus (not shown) locking the case 50 at a position shown by a solid line in FIGS. 1 to 3.

A thread hole 23 in which an axis is set horizontally is formed in an upper portion of the lower tube 22, a screw 24 is fitted to the thread hole 23, and the lower tube 22 is fixed to the upper tube 21 by pressing a leading end of the screw 24 to the upper tube 21. On the other hand, the lower tube 22 can be moved vertically by loosening the screw 24. In this case, the structure may be made such that annular grooves are formed on an outer peripheral surface of the upper tube 21 at a predetermined interval in a height direction, whereby the leading end of the screw 24 is fitted to the annular groove, and the lower tube 22 is firmly fixed.

The case 50 has a gas inlet 51 in a side portion and a gas outlet 52 in an upper portion. A filter 53 is contained in an inner portion of the case 50. Further, a porous body 19 constituted by a porous plate, a net or the like which does not allow a powder body having a set magnitude to pass through and allows a gas to pass through is mounted to the gas outlet 52. In accordance with the structure mentioned above, the powder body metered by a metering container 17 can be discharged from the lower end opening of the lower tube 22 by moving the case 50 to a position shown by a single-dot chain line so as to open the lower end opening of the lower tube 22, whereby it is possible to easily meter and confirm the weight or the like of the powder body metered by the metering container 17. As is apparent from the description, the lower end opening of the lower tube 22 corresponds to a powder body discharge port 55 in claims, and the porous body 19 doubles as a closing member for inhibiting the powder material from flowing out from the powder body discharge port 55 in claims. In this case, the structure may be made such that the powder body discharge port is formed independently and the powder body discharge port is freely opened and closed by an independent closing member from the porous body 19.

The slide plate 13 is structured such as to be freely moved between a position at which the through hole 14 meets the inlet 8 of the base plate 7 and a position at which the through hole 14 meets the outlet 9 of the base plate 7, and is structured such as to close the inlet 8 of the base plate 7 in a state in which the through hole 14 meets the outlet 9 of the base plate 7. The slide plate 13 is actuated by a known actuating apparatus 15 such as a hydraulic cylinder or the like.

A transport pipe 26 is connected to the outlet 9 of the base plate 7, and a receiving hopper (not shown) is connected to an outlet end of the transport pipe 26.

Operation of First Embodiment

Next, a description will be given of an operation of the first embodiment.

First, an internal capacity of the metering container 17 is set to a set value by adjusting a height position of the lower tube 22 with respect to the upper tube 21.

Thereafter, when positioning the through hole 14 of the slide plate 13 to meet the inlet 8 after charging the powder body to the reservoir hopper 1, the powder body flows into the metering container 17, and an inner side of the metering container 17 is filled with the powder body.

Thereafter, the through hole 14 is positioned to meet the outlet 9 of the base plate 7 by sliding the slide plate 13. In accordance with this operation, at the same time when the inlet 8 is closed, the powder body up to the upper end of the through hole 14 in the slide plate 13 moves to the side of the outlet 9 in a state of being metered by the metering container 17.

Thereafter, the air flows into the receiving hopper (not shown) from the porous body 19 by generating the air stream toward an inner side of the receiving hopper (not shown), whereby the powder body within the metering container 17 is fed to the receiving hopper via the transport pipe 26 in accordance with the air stream.

Thereafter, the slide plate 13 is again moved to the position at which the through hole 14 meets the inlet 8.

The same operations are carried out sequentially.

Second Embodiment

Figure 4:
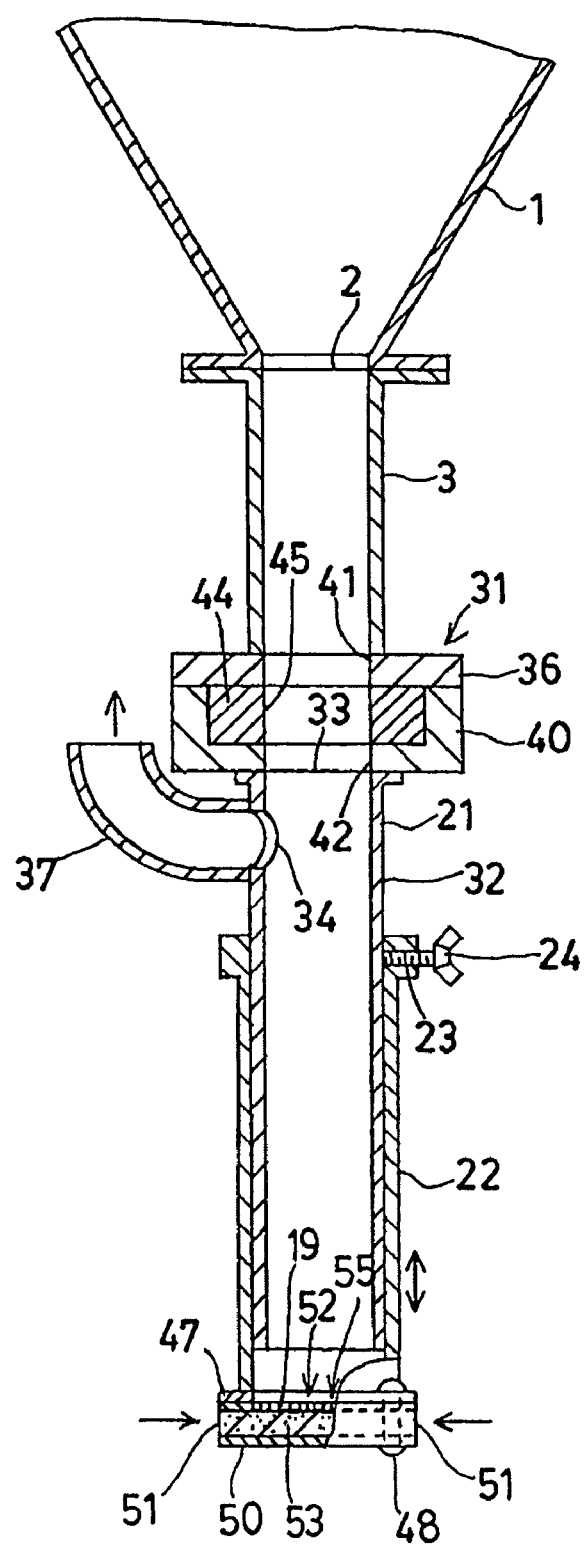
FIG. 4 is a cross sectional view of a main portion showing a second embodiment in accordance with the present invention.

Refer to FIG. 4

A metering apparatus 31 positioned in a lower side of the guide tube 3 has a metering container 32 having an inlet 33 in an upper end and a horizontal outlet 34 in an upper side portion, a check valve 36 opening and closing the inlet 33 of the metering container 32 and connected to a lower end of the guide tube 3, and an upward discharge pipe 37 connected to the horizontal outlet 34.

The horizontal outlet 34 is formed in an upper portion of the upper tube 21 in the metering container 32. Further, an upper end opening of the upper tube 21 corresponds to the inlet 33.

The check valve 36 has a casing 40 having an inlet 41 in an upper portion and an outlet 42 facing the inlet 41 in a lower portion, and a slide plate 44 having a through hole 45 which is freely moved horizontally in a vertical direction to a paper surface of FIG. 4, with respect to the casing 40.

A transport pipe (not shown) is connected to the discharge pipe 37, and a receiving hopper (not shown) is connected to an outlet end of the transport pipe.

Operation of Second Embodiment

Next, a description will be given of an operation of the second embodiment.

First, an internal capacity of the metering container 32 is set to a set value by adjusting a height position of the lower tube 22 with respect to the upper tube 21. In this case, a part of the powder body entering into the metering container 32 flows over into the discharge pipe 37, however, since an overflowing amount is determined on the basis of a kind of the powder body, it is preferable to determine a capacity of the metering container 32 taking the overflowing amount into consideration.

Thereafter, when opening the check valve 36 after charging the powder body to the reservoir hopper 1, the powder body flows into the metering container 32, and an inner side of the metering container 32 is filled with the powder body.

Thereafter, the check valve 36 is closed.

Thereafter, the air flows into the receiving hopper (not shown) from the porous body 19 by generating the air stream toward an inner side of the receiving hopper (not shown), whereby the powder body within the metering container 32 is fed to the receiving hopper via the transport pipe 37 in accordance with the air stream.

Thereafter, the check valve 36 is again opened.

The same operations are carried out sequentially.

A description will be given below of modified embodiments.

(1) The powder body includes a fine particle, a granular body, a micro thin piece, a short fiber piece, a sliver and the like.

(2) The metering apparatus 6 and the metering apparatus 31 are optionally used.

(3) The metering apparatus may be optionally structured as far as the internal capacity is variable. Further, the upper tube and the lower tube may be formed to be transparent.

(4) The closing member for closing the powder body discharge port 55 so as to freely open and close may be structured such as to be freely oscillated vertically.

INDUSTRIAL APPLICABILITY

The present invention is suitable for metering and supplying a powder body of a synthetic resin raw material to an injection molding machine, in a molding system of a synthetic resin product.

What is claimed is:

1. A powder body metering apparatus comprising:
   a base plate having an inlet and an outlet provided through in a vertical direction;
   a slide plate provided in a lower surface of the base plate so as to freely move horizontally and having a through hole provided in a vertical direction; and
   a metering container in which an edge portion of an upper end opening is fixed to an edge portion of the through hole of the slide plate,
   the metering container being structured such that said metering container is variable in an internal capacity,
   the metering container being provided in a lower portion with a porous body not allowing a powder body having a set magnitude to pass through and allowing a gas to pass through, wherein:
   said slide plate is freely movable between a position at which the through hole meets the inlet of the base plate and a position at which the through hole meets the outlet of the base plate,
   the inlet of the base plate is closed in a state in which the through hole meets the outlet of the base plate,
   a powder body discharge port is formed in a lower portion of said metering container, and
   the powder body discharge port is freely opened and closed by a closing member for inhibiting the powder body from flowing out of the metering container,
   said closing member being formed at least in part by said porous body.

2. A powder body metering apparatus comprising;
   a metering container having an inlet in an upper end and a horizontal outlet in an upper side portion,
   a check valve for opening and closing the inlet of the metering container, and
   an upward discharge pipe connected to the horizontal outlet,
   the metering container being structured such that said metering container is variable in an internal capacity,
   the metering container being provided in a lower portion with a porous body not allowing a powder body having a set magnitude to pass through and allowing a gas to pass through, wherein:
   a powder body discharge port is formed in a lower portion of said metering container, and
   the powder body discharge port is freely opened and closed by a closing member for inhibiting the powder body from flowing out of the metering container,
   said closing member being formed at least in part by said porous body.

\* \* \* \* \*